United States Patent [19]
Squitteri et al.

[11] Patent Number: 5,884,265
[45] Date of Patent: Mar. 16, 1999

[54] METHOD AND SYSTEM FOR SELECTIVE DISPLAY OF VOICE ACTIVATED COMMANDS DIALOG BOX

[75] Inventors: Paul Anthony Squitteri, Boynton Beach, Fla.; Xiaotong Wang, Round Rock, Tex.

[73] Assignee: International Business Machines Corporation, Armonk, N.Y.

[21] Appl. No.: 826,459

[22] Filed: Mar. 27, 1997

[51] Int. Cl.[6] .............................. G10L 3/00; G10L 5/06; G10L 9/00
[52] U.S. Cl. .................................... 704/275; 704/251
[58] Field of Search ..................... 704/275, 251

[56] References Cited

U.S. PATENT DOCUMENTS

| | | |
|---|---|---|
| 4,087,630 | 5/1978 | Browning et al. . |
| 4,718,096 | 1/1988 | Meisel . |
| 4,776,016 | 10/1988 | Hansen . |
| 5,228,112 | 7/1993 | Lemelson . |
| 5,335,313 | 8/1994 | Douglas . |
| 5,377,303 | 12/1994 | Firman ................................ 704/275 |
| 5,402,518 | 3/1995 | Lowery . |

*Primary Examiner*—David R. Hudspeth
*Assistant Examiner*—Robert Louis Sax
*Attorney, Agent, or Firm*—Volel Emile; Jack V. Musgrove; Andrew J. Dillon

[57] ABSTRACT

Provided is an improved graphical user interface method and system to be utilized with voice input. The method and system remove a voice activated commands dialog box when a voice input system is not active. The method and system achieve the forgoing objects by (1) sensing whether a voice input system is active or inactive, which can be achieved by determining whether a voice input program is set to actively receive voice input in response to a change of state of a voice input device (such as a microphone); and (2) removing a voice activated commands dialog box from prominent display within a graphical user interface if the voice input system is sensed inactive.

17 Claims, 4 Drawing Sheets

METHOD AND SYSTEM FOR SELECTIVE DISPLAY OF VOICE ACTIVATED COMMANDS DIALOG BOX

BACKGROUND OF THE INVENTION

1. Technical Field

The present invention relates, in general, to an improved graphical user interface method and system. In particular, the present invention relates to an improved graphical user interface method and system to be utilized with voice input. More specifically, the present invention relates to an improved graphical user interface method and system to be utilized with voice input, and which removes a voice activated commands dialog box when a voice input system is not active.

2. Background

A graphical user interface is a type of display format that enables a user to choose commands, start programs, and see lists of files and other options by pointing to pictorial representations and lists of menu items on a computer display screen. Graphical user interface environments rely on icons, which are small graphic images displayed on a computer display screen, to represent graphical objects that can be manipulated by a user.

For application program users, a graphical user interface offers an environment that can handle direct interaction with the computer. Such environments free the application program user to concentrate on a given application without becoming entangled in the details of a screen display or keyboard input. A graphical user interface also enables programmers to create programs to handle frequently performed tasks, such as saving a data file. The interface itself provides standard controlling mechanisms such as windows and dialog boxes.

Traditionally, these controlling mechanisms have been activated by either a keyboard or a pointing device such as a mouse. A mouse is a commonly used pointing device, containing one or more buttons, that allows a user to interact with a product or operating environment such as a graphical user interface. The mouse is used to position a cursor within the graphical user interface, and then used to activate the control mechanisms by dragging or clicking on icons. Thus, the graphical user interface utilizes such dragging and clicking operations to effect program control and input that prior to such graphical user interfaces required a great deal of user keyboard input.

Relatively recently, advances in speech recognition technology have made it possible to perform many of the functions traditionally done via mouse and keyboard input by voice input. In order to provide such voice input control, a user typically speaks into a microphone and "trains" a computing system to recognize a list of commands. Once the computing system has been so trained, the user can then control the graphical user interface via voice input.

In order to assist a user utilizing voice input, it has become standard within the industry to display a dialog box within a graphical user interface to remind the user what commands his or her computer has been "trained" to recognize. This dialog box can be quite large and can consume a large amount of surface area within the graphical user interface display.

While such voice input has proven to be exceedingly useful for many applications (such as dictation), there are still instances where mouse/keyboard input is preferred (such as with a drawing program). Consequently, it is not unusual for a user to switch back and forth between voice input and mouse/keyboard input.

As has been stated, the dialog box showing the commands which the computing system has been trained to recognize can be quite large. It is common to set the default of a computing system such that the dialog box showing the available voice activated commands remains "on top" of the other objects within the graphical user interface (that is, the dialog box is always the foremost box displayed within the graphical user interface). This situation becomes problematic when the user desires to go from voice input to mouse/keyboard input in that the dialog box, which is no longer needed, continues to remain "on top" of all other objects within the graphical user interface.

In light of the foregoing, it is clear that a need exists for a method and system which removes the voice activated commands dialog box from the graphical user interface when the voice activated commands dialog box is not needed.

SUMMARY

It is therefore one object of the present invention to provide an improved graphical user interface method and system.

It is therefore another object of the present invention to provide an improved graphical user interface method and system to be utilized with voice input.

It is yet another object of the present invention to provide an improved graphical user interface method and system to be utilized with voice input, and which removes a voice activated commands dialog box when a voice input system is not active.

The foregoing objects are achieved as is now described. The method and system achieve the forgoing objects by (1) sensing whether a voice input system is active or inactive, which can be achieved by determining whether a voice input program is set to actively receive voice input in response to a change of state of a voice input device (such as a microphone); and (2) removing a voice activated commands dialog box from prominent display within a graphical user interface if the voice input system is sensed inactive.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION

In the following figures, like parts are indicated by like numbers.

Figure 1:
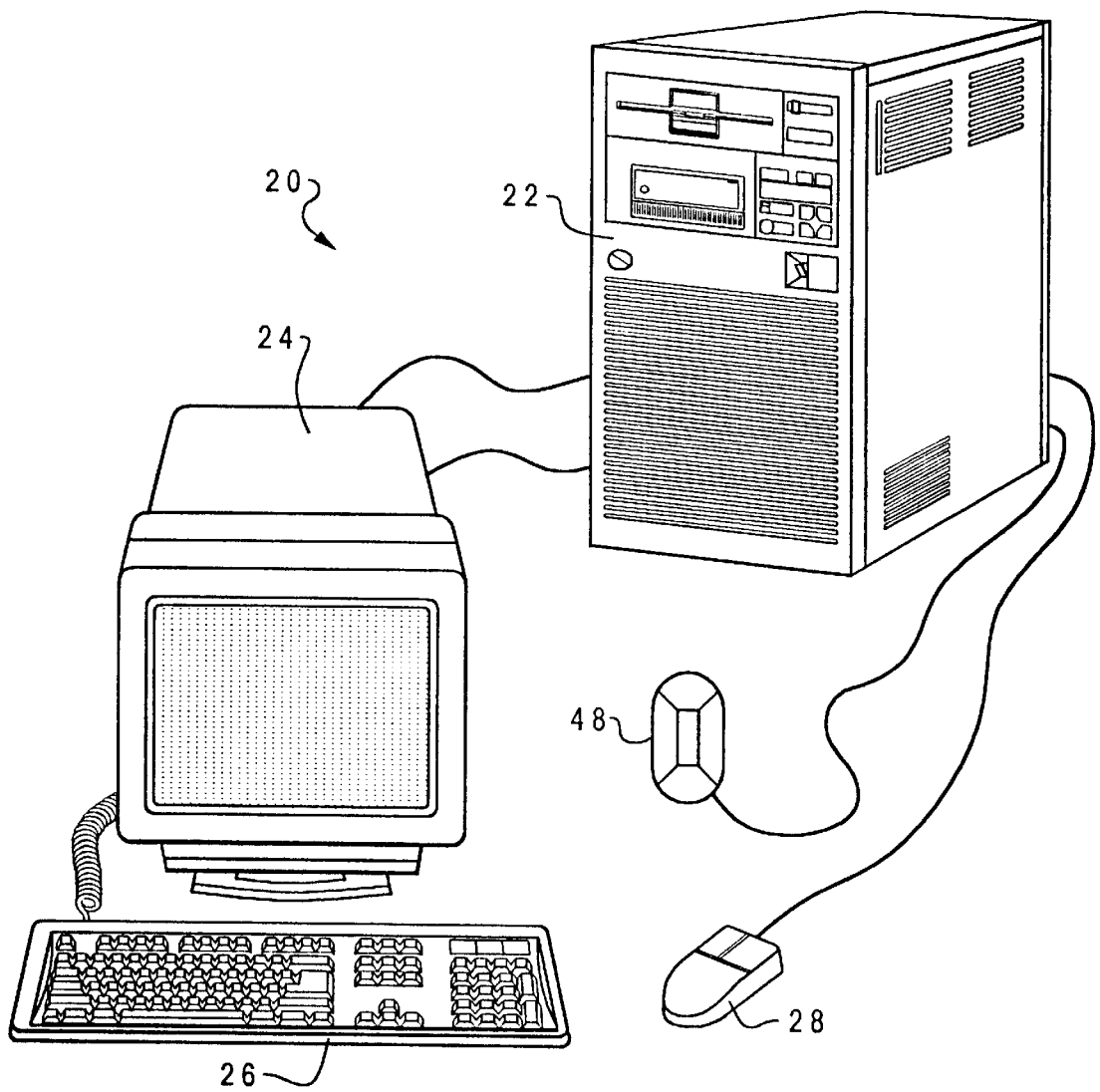
FIG. 1 depicts a pictorial representation of a data-processing system which can be utilized in accordance with the method and system of an illustrative embodiment of the present invention.

With reference now to the figures and in particular with reference now to FIG. 1, there is depicted a pictorial representation of a data-processing system which can be utilized in accordance with the method and system of an illustrative embodiment of the present invention. The graphical user interface system and method provided by an illustrative embodiment of the present invention can be implemented with the data-processing system depicted in FIG. 1. A computer 20 is depicted which includes a system unit 22, a video display terminal 24, a keyboard 26, a mouse 28, and a microphone 48. Computer 20 may be implemented utilizing any suitable computer such as the IBM RISC/6000 computer or IBM "Aptiva" computer, both products of International Business Machines Corporation, located in Armonk, N.Y. "RISC SYSTEM/6000" and "Aptiva" are trademarks of International Business Machines Corporation.

Figure 2:
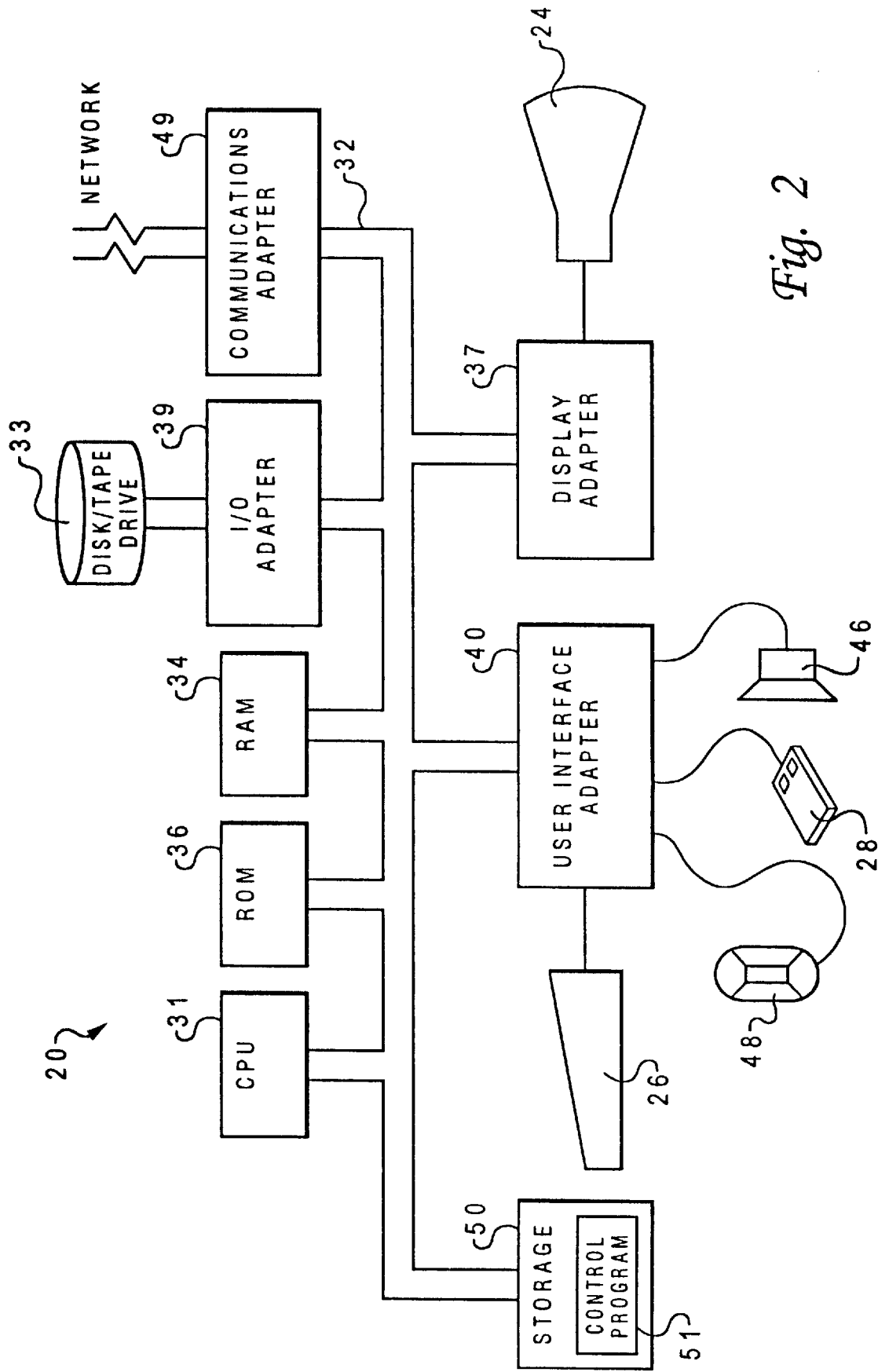
FIG. 2 is an illustration of a representative hardware environment which incorporates a graphical user interface which can be utilized in accordance with the method and system of an illustrative embodiment of the present invention.

FIG. 2 is an illustration of a representative hardware environment which incorporates a graphical user interface which can be utilized in accordance with the method and system of an illustrative embodiment of the present invention. FIG. 2 depicts selected components in computer 20 in which an illustrative embodiment of the present invention may be implemented. Computer 20 includes a Central Processing Unit ("CPU") 31, such as a conventional microprocessor, and a number of other units interconnected via system bus 32. Such components and units of computer 20 can be implemented in a system unit such as unit 22 of FIG. 1. Computer 20 includes random-access memory ("RAM") 34, read-only memory ("ROM") 36, display adapter 37 for connecting system bus 32 to video display terminal 24, and I/O adapter 39 for connecting peripheral devices (e.g., disk and tape drives 33) to system bus 32. Video display terminal 24 is the visual output of computer 20, which can be a CRT-based video display well-known in the art of computer hardware. However, with a portable or notebook-based computer, video display terminal 24 can be replaced with an LCD-based or a gas plasma-based flat-panel display. Computer 20 further includes user interface adapter 40 for connecting keyboard 26, mouse 28, speaker 46, microphone 48, and/or other user interface devices, such as a touch screen device (not shown), to system bus 32. Communications adapter 49 connects computer 20 to a data-processing network.

Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIXwindows windowing system (i.e., graphical user interface) can direct CPU 31. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 31, such as touch-screen technology or human voice control. In addition, computer 20 includes a control program 51 which resides within computer storage 50. Control program 51 contains instructions that when executed on CPU 31 carries out the operations depicted in the logic flowchart of FIG. 4 described herein.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final preliminary matter, it is important that while an illustrative embodiment of the present invention has been, and will continue to be, described in the context of a fully functional computing system, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include: recordable type media such as floppy disks, hard disk drives, CD ROMs, and transmission type media such as digital and analogue communication links.

Figure 3:
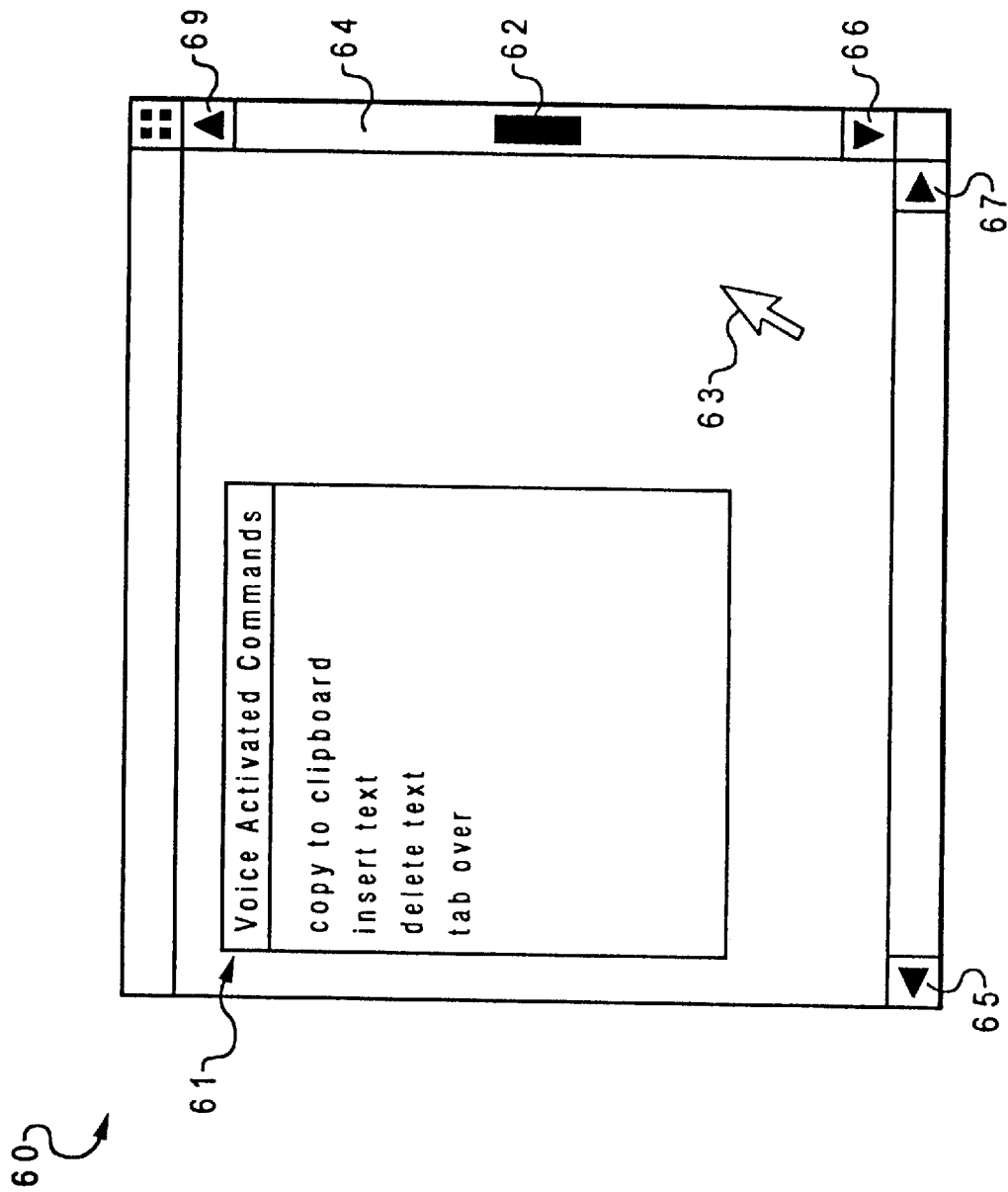
FIG. 3 depicts a pictorial representation of a graphical user interface window which can be utilized in accordance with the method and system of an illustrative embodiment of the present invention.

FIG. 3 depicts a pictorial representation of a graphical user interface window 60 which may be utilized in accordance with the method and system of an illustrative embodiment of the present invention. Window 60 displays a voice activated commands dialog box 61. Voice activated commands dialog box 61 contains multiple commands for illustration purposes, such as insert, delete, tab, etc., which represent those voice activated commands which computer 20 has been trained to recognize. However, those skilled in the art will appreciate such voice input commands are not limited to these specific commands. FIG. 3 also shows arrows 65, 66, 67, 69, scroll bar 64, elevator 62, and a cursor 63 which are used to navigate about a graphical user interface window in a manner that is well known within the art.

Figure 4:
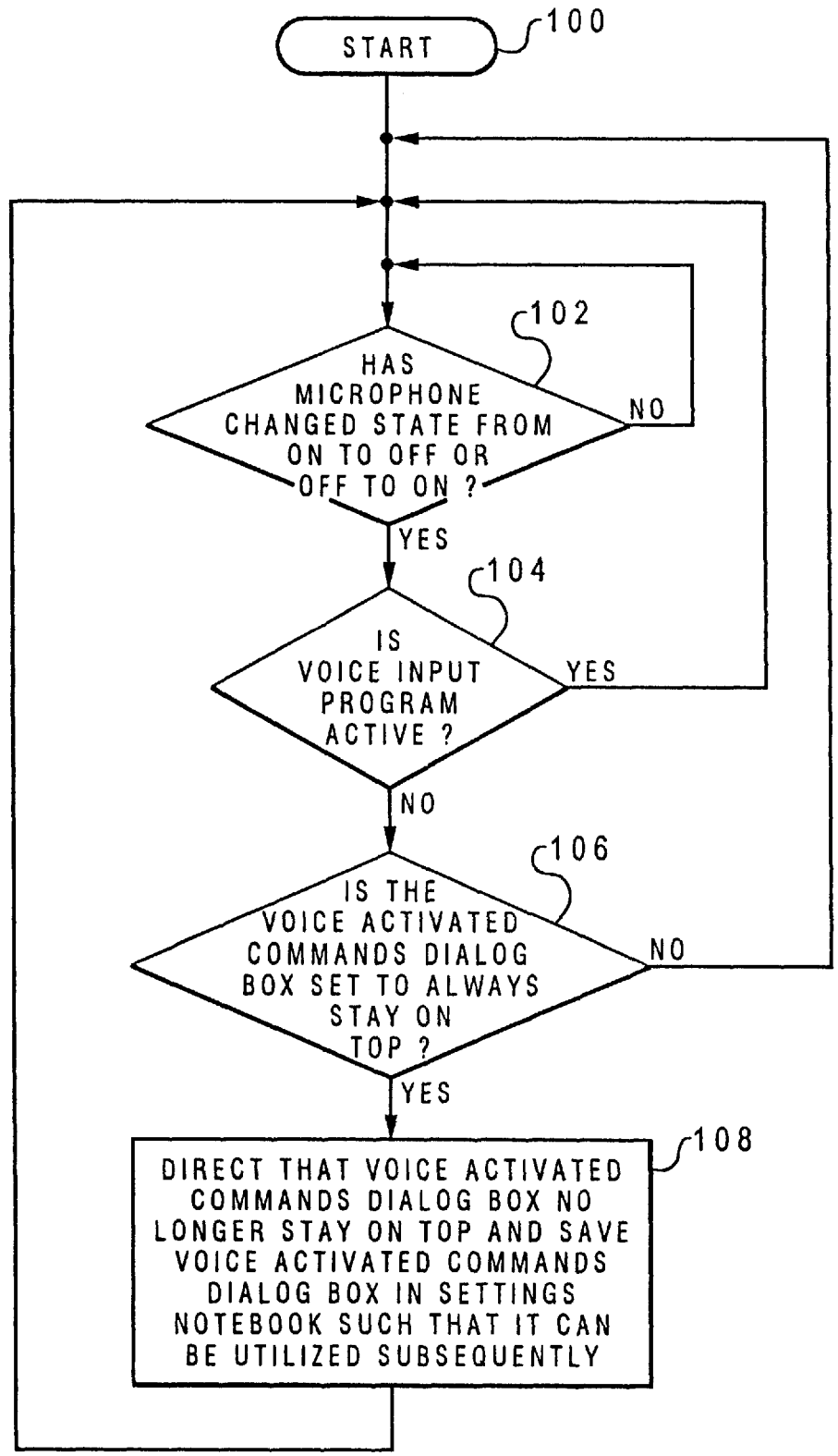
FIG. 4 is a high level logic flowchart which depicts the method and process of the present invention.

Refer now to FIG. 4 which is a high level logic flowchart which depicts the method and process of the present invention. The term "on top" as used in reference to FIG. 4 means that the dialog box which is "on top" is arranged such that it is always visible as the foremost graphical object within the graphical user interface irrespective of what applications may be running. Method step 100 shows the start of the process. Method step 102 illustrates the inquiry as to whether the microphone changes state from off to on, or on to off. Method step 102 shows that if the microphone has not changed state since the last time the microphone state was checked, then the process returns to method step 100 and continues from that point. However, if the inquiry of method step 102 shows that the microphone has changed state from the last time that it was examined, then the process proceeds to method step 104.

Method step 104 depicts the inquiry as to whether a voice input program is active, where "active" means that the voice input program is set to actively receive voice input. Those skilled in the art will recognize that there are many voice input programs such as IBM's VoiceType. If the inquiry of method step 104 indicates that a voice input program is active, then the process returns to method step 100 and continues from that point. The reason that the program returns to method step 100 at this juncture is that if the voice input program is active, then it is not necessary to remove the voice activated commands dialog box from the top of the graphical user interface since the fact that the voice input program is active indicates that the voice activated commands dialog box is still being used. However, if method step 104 yields the determination that a voice input program is no longer active, then the process proceeds to method step 106.

Method step 106 shows the inquiry regarding whether the voice activated commands dialog box option has been set to be such that the voice activated commands dialog box always appears on the top of the graphical user interface.

That is, has the voice activated commands dialog box been directed to always be in the foremost position within the graphical user interface. If such is not the case, then method step 106 shows that the process returns to method step 100 and continues from that point. The reason that the process returns to method step 100 at this juncture is that if the voice activated commands dialog box option has not been set such that the voice activated commands dialog box is always to be on top of the graphical user interface, it is known that the voice activated commands dialog box will not appear on top should another program be activated and brought to the forefront of the graphical user interface.

If the inquiry of method step 106 indicates that the voice activated commands dialog box has been set to always appear on top of the graphical user interface, then the process proceeds to method step 108 wherein it is directed that the voice activated commands dialog box no longer stay on top but rather go into the background and the commands, location, size, contents, etc., of the voice activated commands dialog box are saved in the settings notebook so that they can be utilized subsequently should the voice activated system be reactivated. Subsequent to directing that the voice activated commands dialog box no longer stay on top, the process proceeds to method step 100 and continues from that point.

The foregoing has not demonstrated or noted how often the method and process shown in FIG. 4 should be engaged in. This is because it is envisioned that the frequency with which the method and process of FIG. 4 are engaged in will be a parameter that is setable by a programmer.

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A method to be utilized within a data processing system having a graphical user interface and a selectively activateable voice input system, said method comprising the steps of:

sensing whether a voice input system is active or inactive; and in response to a determination that said voice input system is inactive, removing a voice activated commands dialog box from prominent display within said graphical user interface.

2. The method of claim 1 wherein said voice input system further includes a voice input device and said sensing step further comprises the step of:

in response to a change of state of said voice input device, determining if a voice input program is set to actively receive voice input in which case said voice input system is noted active.

3. The method of claim 1 wherein said removing step further comprises the step of placing said voice activated commands dialog box in a position other than foremost relative to other graphical objects within said graphical user interface.

4. The method of claim 1 wherein said removing step further comprises the step of deleting said voice activated commands dialog box from said graphical user interface.

5. A system to be utilized within a data processing system having a graphical user interface and a selectively activateable voice input system, said system comprising:

means for sensing whether a voice input system is active or inactive; and means, responsive to a determination that said voice input system is inactive, for removing a voice activated commands dialog box from prominent display within said graphical user interface.

6. The system of claim 5 wherein said voice input system further includes a voice input device and said means for sensing further comprises:

means, responsive to a change of state of said voice input device, for determining if a voice input program is set to actively receive voice input in which case said voice input system is noted active.

7. The system of claim 5 wherein said means for removing further comprises means for placing said voice activated commands dialog box in a position other than foremost relative to other graphical objects within said graphical user interface.

8. The system of claim 5 wherein said means for removing further comprises means for deleting said voice activated commands dialog box from said graphical user interface.

9. A program product to be utilized within a data processing system having a graphical user interface and a selectively activateable voice input system, said program product comprising:

instruction means for sensing whether a voice input system is active or inactive;

instruction means, responsive to a determination that said voice input system is inactive, for removing a voice activated commands dialog box from prominent display within said graphical user interface; and signal bearing media bearing said means for sensing and said means for removing.

10. The program product of claim 9 wherein said signal bearing media comprises recordable media.

11. The program product of claim 9 wherein said signal bearing media comprises transmission media.

12. The program product of claim 9 wherein said voice input system further includes a voice input device and said instruction means for sensing further comprises:

instruction means, responsive to a change of state of said voice input device, for determining if a voice input program is set to actively receive voice input in which case said voice input system is noted active.

13. The program product of claim 9 wherein said instruction means for removing further comprises instruction means for placing said voice activated commands dialog box in a position other than foremost relative to other graphical objects within said graphical user interface.

14. The program product of claim 9 wherein said instruction means for removing further comprises instruction means for deleting said voice activated commands dialog box from said graphical user interface.

15. The method of claim 1 comprising the further step of determining that the voice activated commands dialog box has been set to be displayed prominently within said graphical user interface.

16. The system of claim 5 further comprising means for determining that the voice activated commands dialog box has been set to be displayed prominently within said graphical user interface.

17. The program product of claim 9 further comprising instruction means for determining that the voice activated commands dialog box has been set to be displayed prominently within said graphical user interface, wherein said signal bearing media also bears said determining means.

* * * * *